No. 635,213. Patented Oct. 17, 1899.
J. WEST.
ENVELOP MACHINE.
(Application filed Feb. 28, 1899.)
(No Model.) 10 Sheets—Sheet 1.
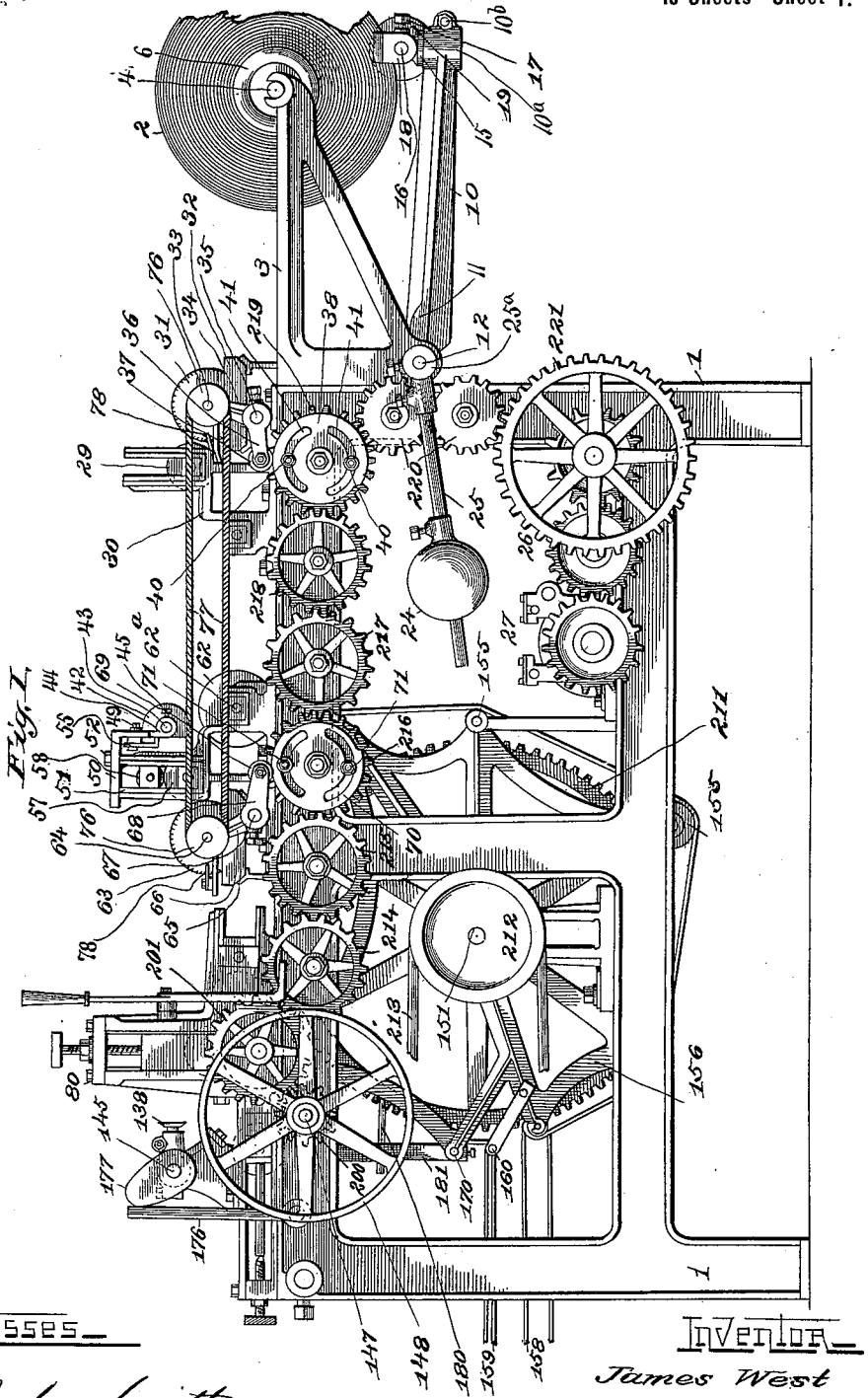
Witnesses
Inventor
James West
By
Attorneys

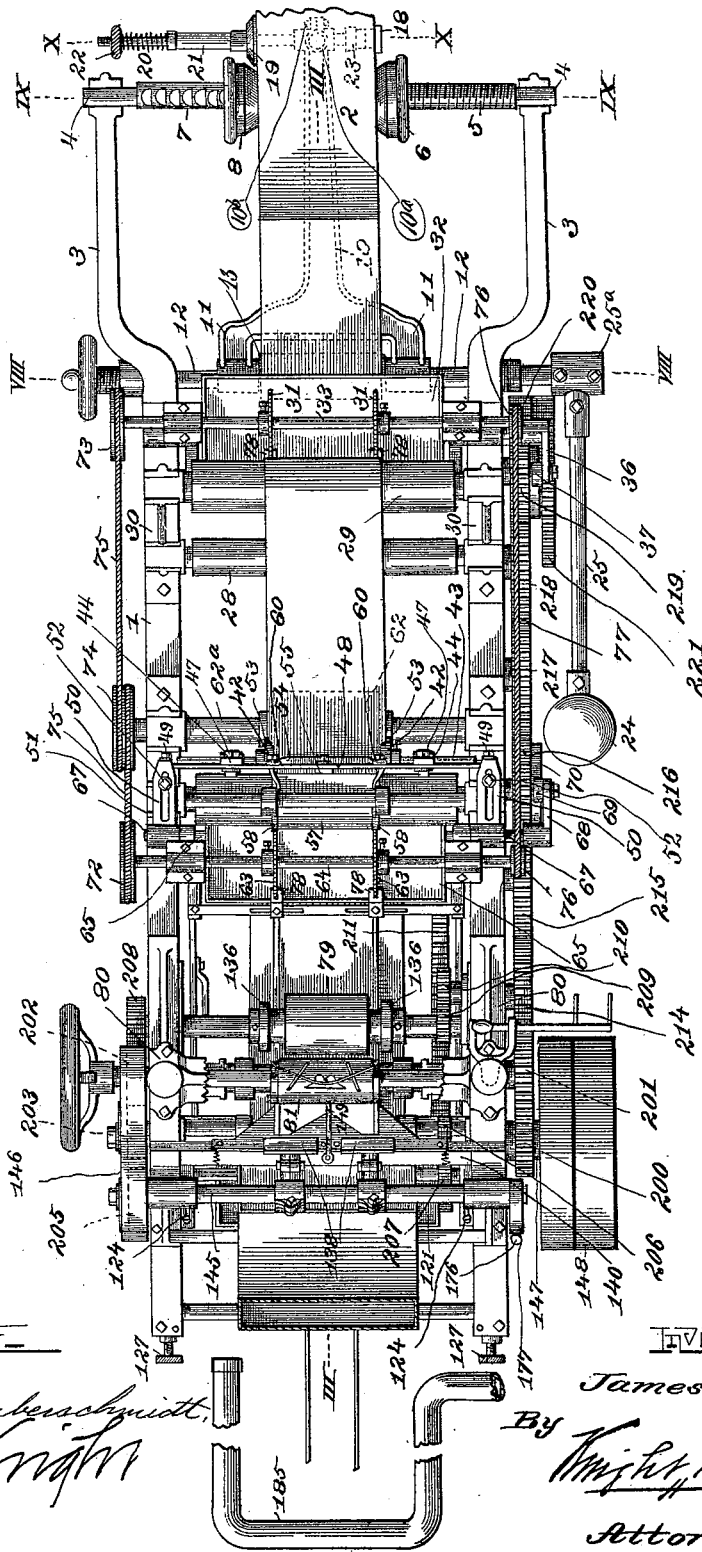

No. 635,213. Patented Oct. 17, 1899.
J. WEST.
ENVELOP MACHINE.
(Application filed Feb. 28, 1899.)
(No Model.) 10 Sheets—Sheet 3.
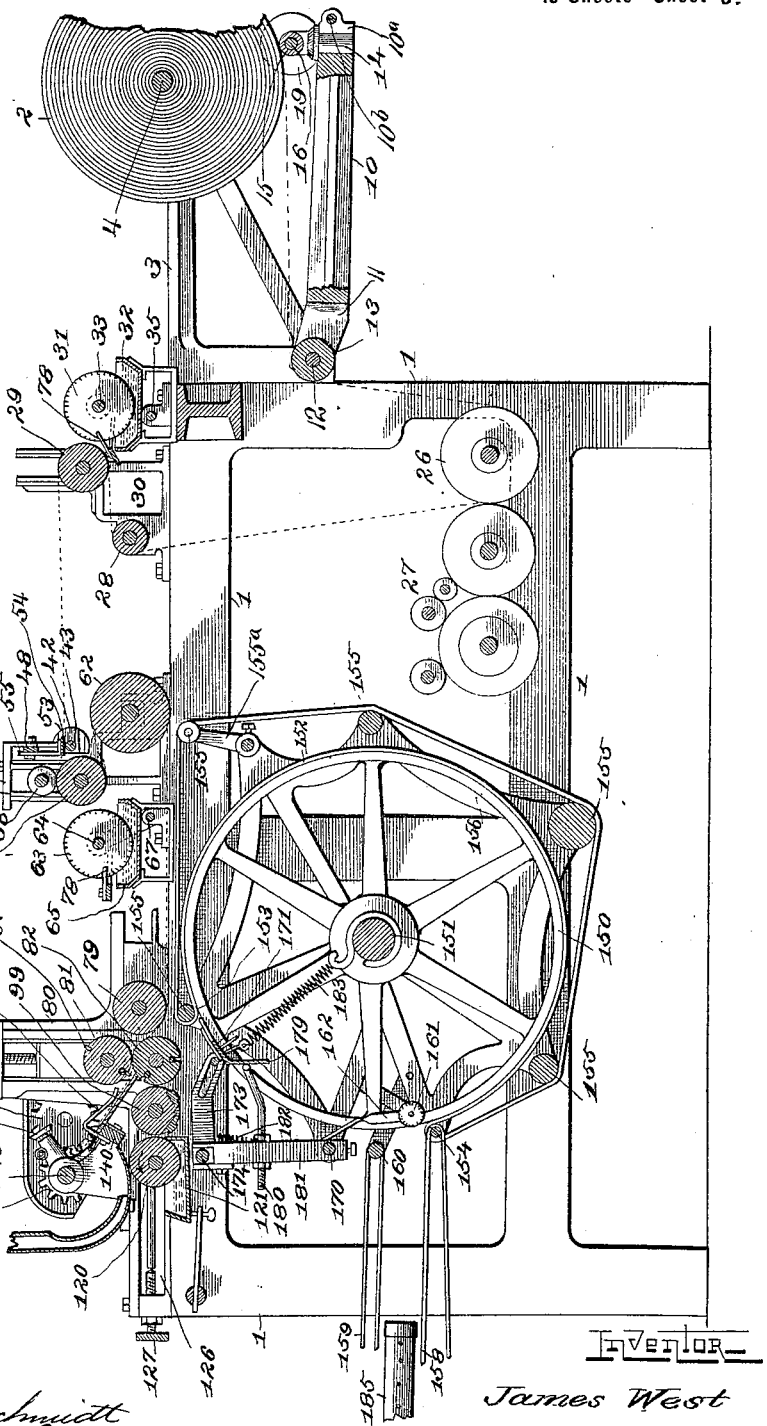
Witnesses
Inventor
James West No. 635,213. Patented Oct. 17, 1899.
J. WEST.
ENVELOP MACHINE.
(Application filed Feb. 28, 1899.)
(No Model.) 10 Sheets—Sheet 4.
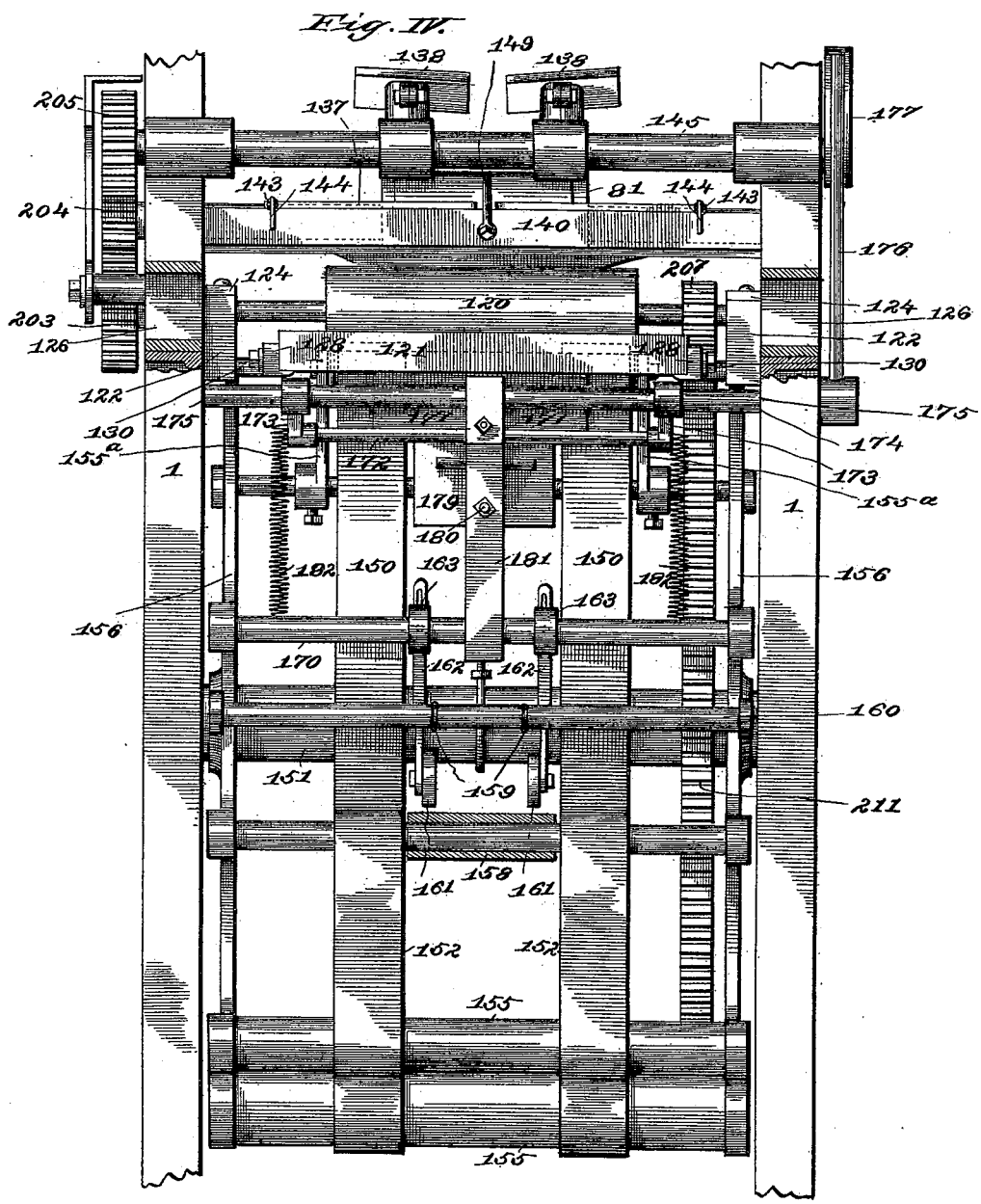

No. 635,213. Patented Oct. 17, 1899.
J. WEST.
ENVELOP MACHINE.
(Application filed Feb. 28, 1899.)
(No Model.) 10 Sheets—Sheet 5.
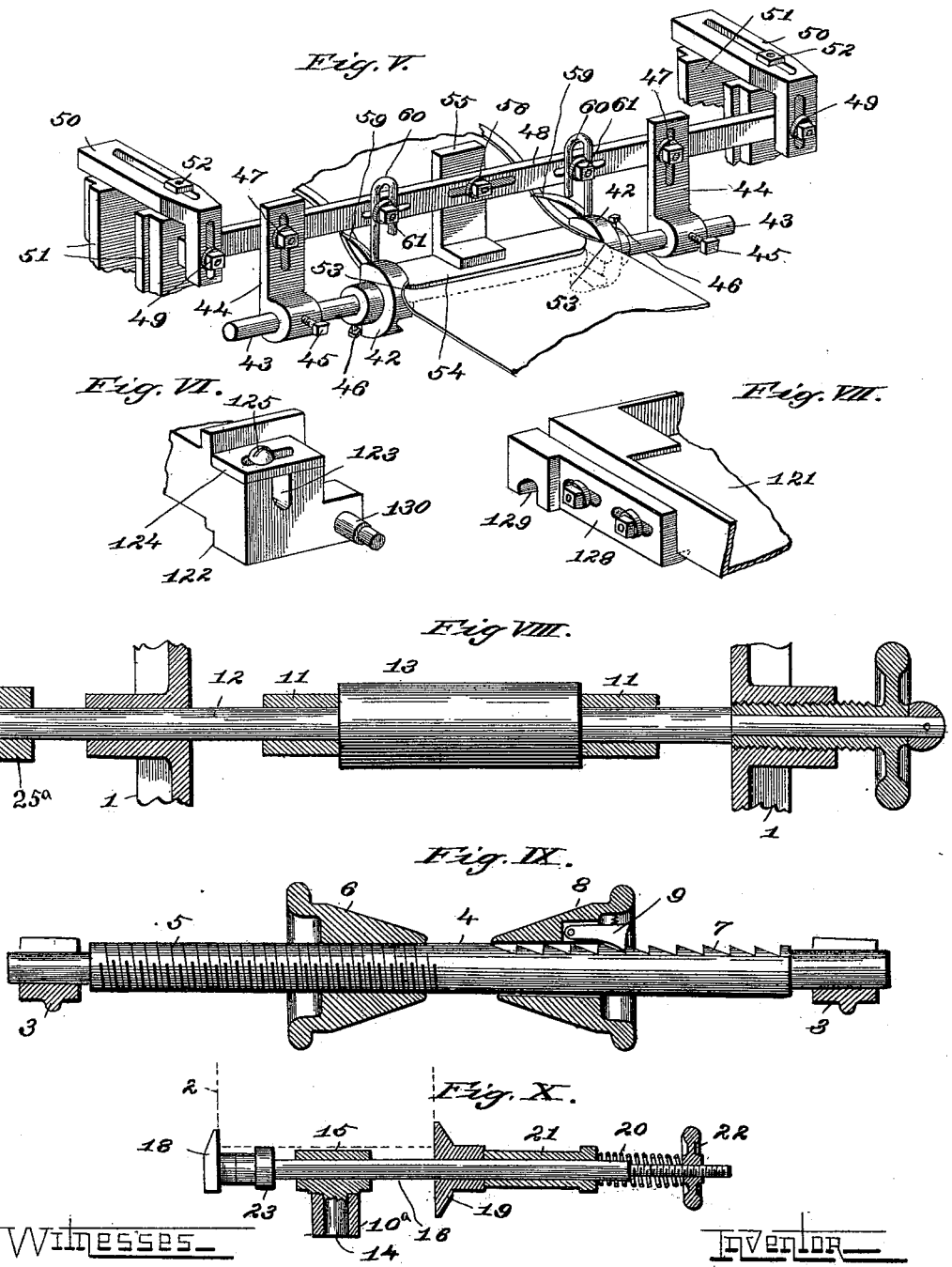

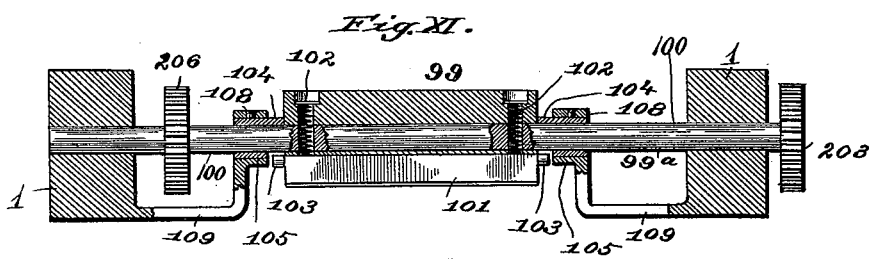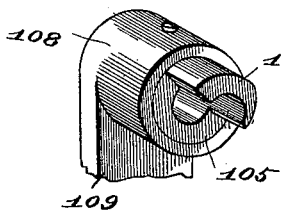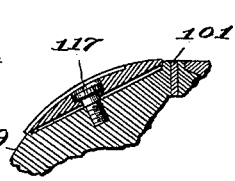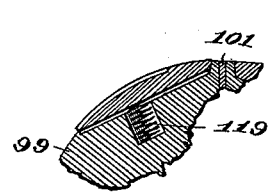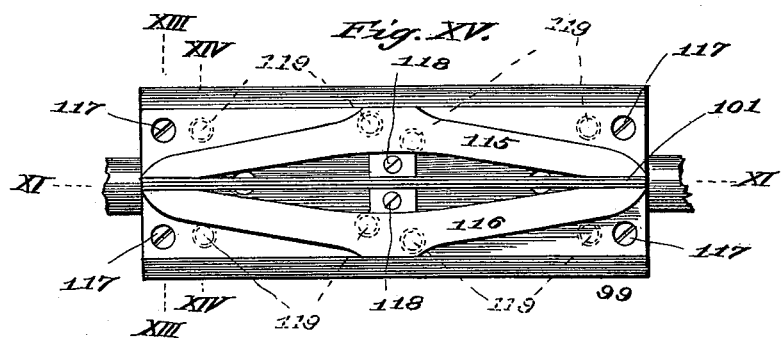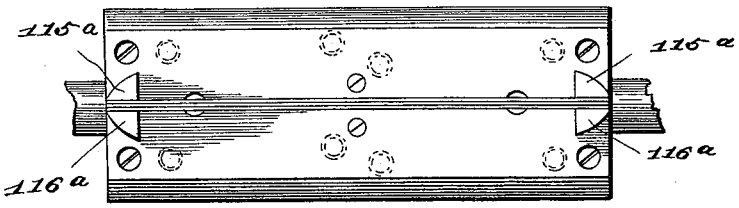

No. 635,213. Patented Oct. 17, 1899.
J. WEST.
ENVELOP MACHINE.
(Application filed Feb. 28, 1899.)
(No Model.) 10 Sheets—Sheet 7.
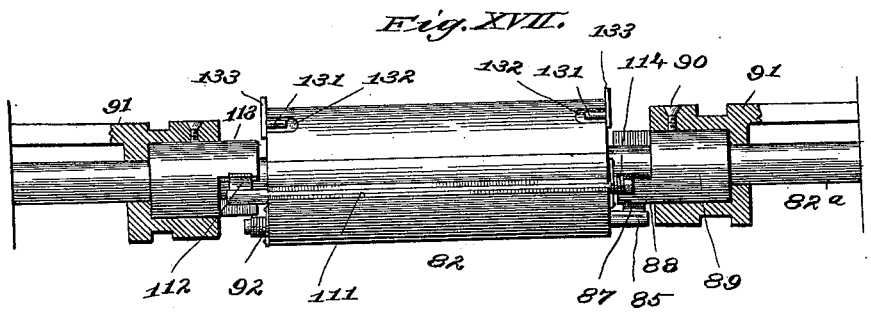
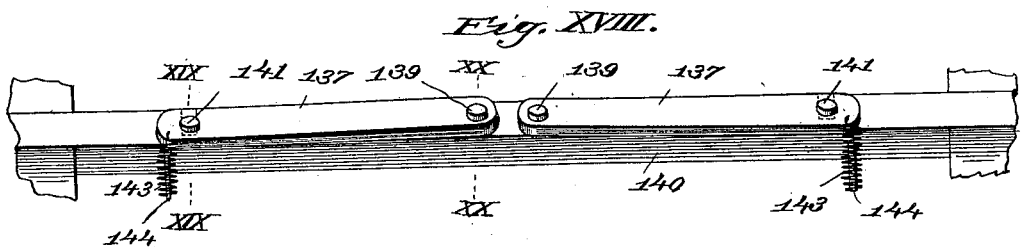
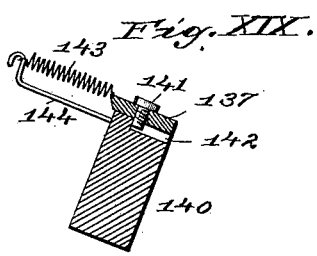 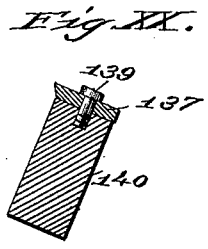
Witnesses
Inventor
James West.
By Knight Bro
Attorneys No. 635,213. Patented Oct. 17, 1899.
J. WEST.
ENVELOP MACHINE.
(Application filed Feb. 28, 1899.)
(No Model.) 10 Sheets—Sheet 8.
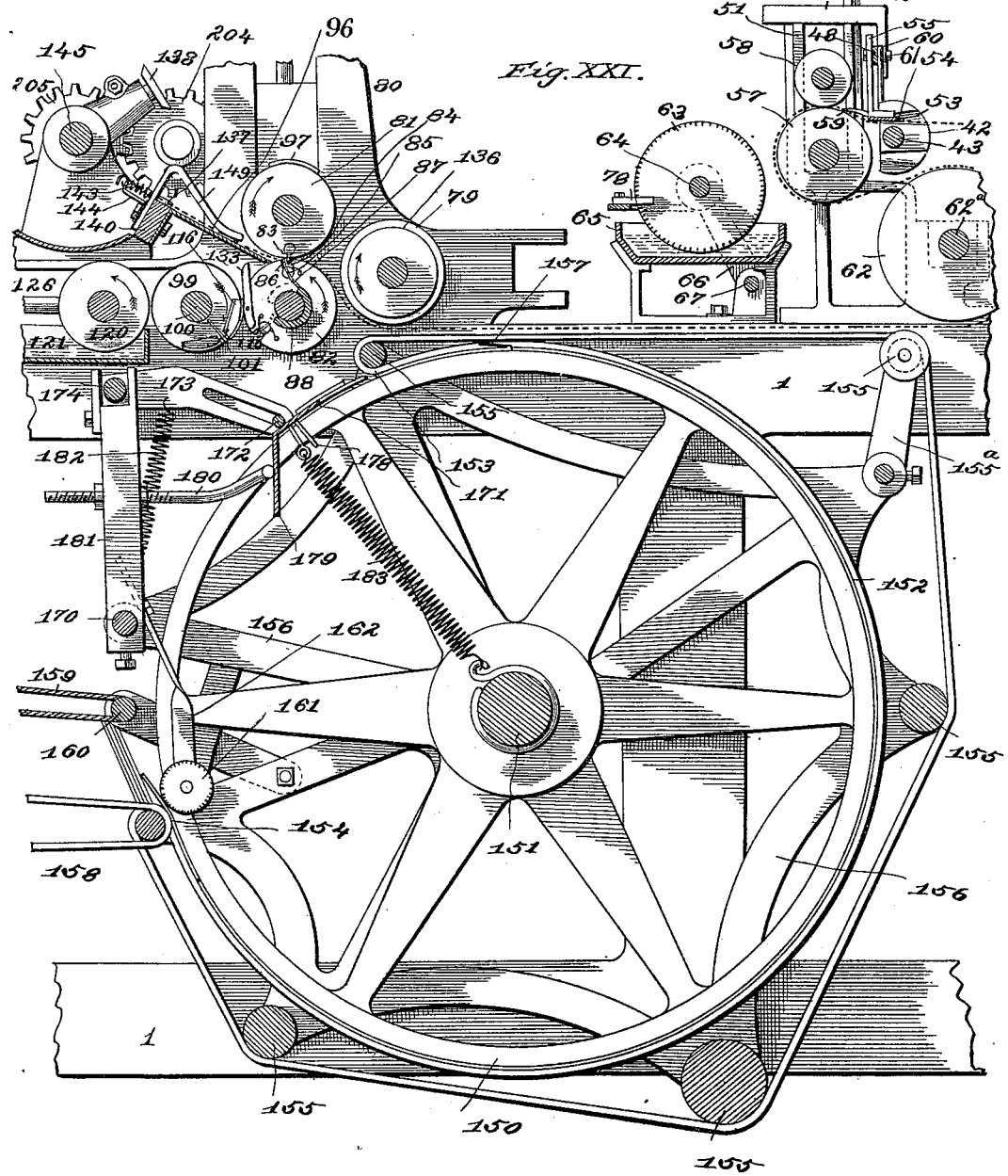
Fig. XXI.
Witnesses
Inventor
James West
By Knight Bro
Attorneys No. 635,213. Patented Oct. 17, 1899.
J. WEST.
ENVELOP MACHINE.
(Application filed Feb. 28, 1899.)
(No Model.) 10 Sheets—Sheet 9.
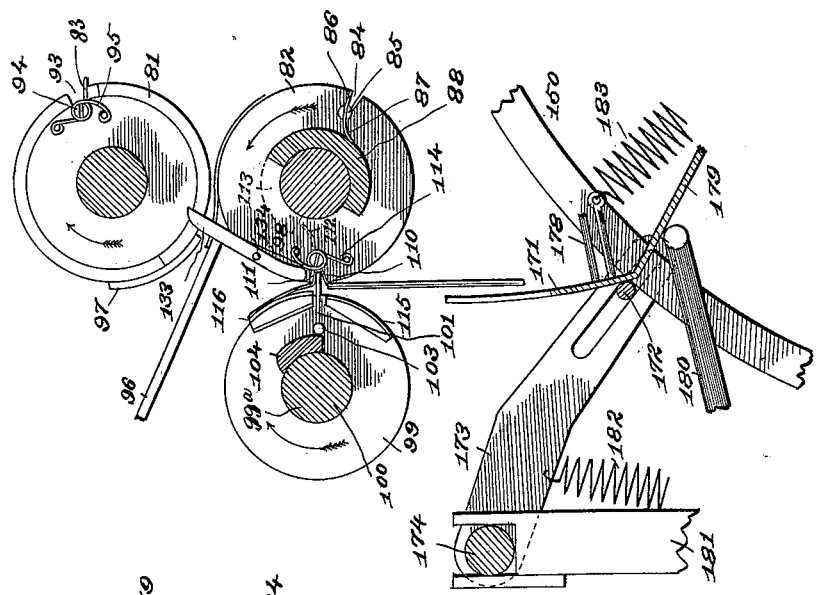
Witnesses
Inventor
James West
By Knight Bro
Attorneys No. 635,213. Patented Oct. 17, 1899.
J. WEST.
ENVELOP MACHINE.
(Application filed Feb. 28, 1899.)
(No Model.) 10 Sheets—Sheet 10.
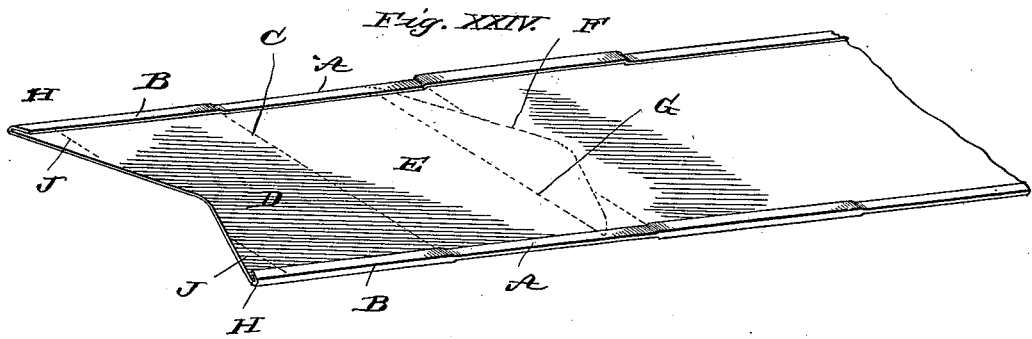
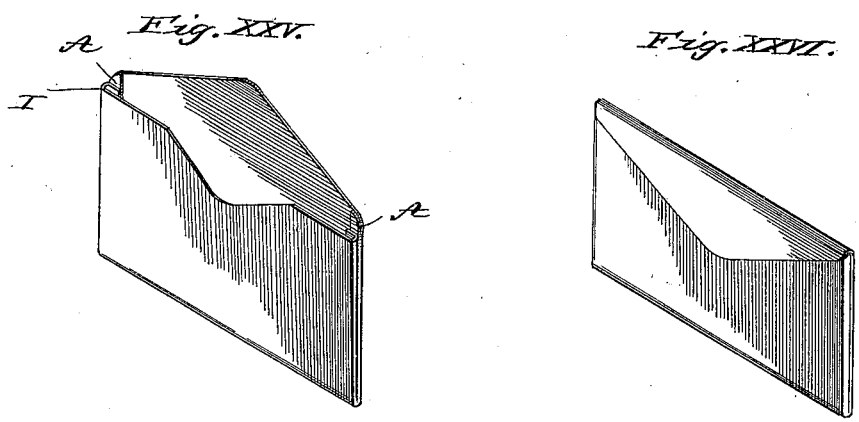
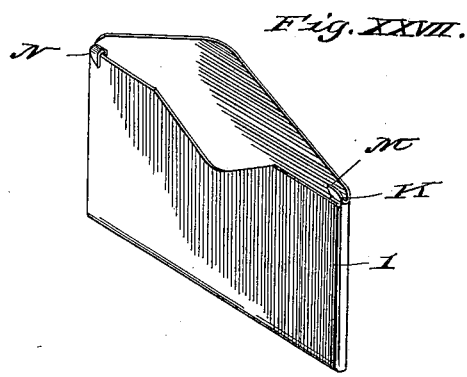
Witnesses
G. A. Rauberschmidt
E. S. Knight
Inventor
James West
By Knight Bro'
Attorneys

United States Patent Office.

JAMES WEST, OF ST. LOUIS, MISSOURI, ASSIGNOR TO THE SAMUEL CUPPLES ENVELOPE COMPANY, OF SAME PLACE.

ENVELOP-MACHINE.

SPECIFICATION forming part of Letters Patent No. 635,213, dated October 17, 1899.

Application filed February 28, 1899. Serial No. 707,204. (No model.)

*To all whom it may concern:*

Be it known that I, JAMES WEST, a citizen of the United States, residing at the city of St. Louis, in the State of Missouri, have invented certain new and useful Improvements in Envelop-Machines, of which the following is a full, clear, and exact description, reference being had to the accompanying drawings, forming part of this specification.

My present invention relates to certain improvements on the machines shown and described in my Patents No. 442,839, dated December 16, 1890, and No. 479,042, dated July 19, 1892.

My present invention consists in features of novelty hereinafter fully described, and pointed out in the claims.

Figure I is a side elevation of my improved machine. Fig. II is a top or plan view. Fig. III is a vertical longitudinal section taken on line III III, Fig. II. Fig. IV is an enlarged detail top view. Fig. V is a perspective view of the mechanism for giving the edge folds to the paper. Fig. VI is a detail perspective view of one of the supports for the pot that contains the sealing paste or gum. Fig. VII is a detail perspective view of the pot that contains the sealing-gum. Fig. VIII is a detail vertical section taken on line VIII VIII, Fig. II, the roller over which the paper passes being shown in elevation. Fig. IX is a section taken on line IX IX, Fig. II, and representing the spindle for supporting the roll of paper. Fig. X is a section taken on line X X, Fig. II, and representing the guide for directing the paper accurately to the machine. Fig. XI is a sectional view taken on line XI XI, Fig. XV, and illustrates the combined paster and folder and its support. Fig. XII is a detail perspective view illustrating one of the cams that move the folding-blade of the paster. Fig. XIII is a detail sectional view taken on line XIII XIII, Fig. XV. Fig. XIV is a like view taken on line XIV XIV, Fig. XV. Fig. XV is a front view of the combined paster and folder. Fig. XVI is a face view of the combined paster and folder in a modified form. Fig. XVII is a view, part in elevation and part in section, showing the mechanism for giving the bottom fold to the envelop and for directing the corners of the web of paper upwardly when the web has been severed by the knife. Fig. XVIII is an elevation illustrating the stationary (as distinguished from the revolving) knives for cutting the corners off the web of paper that were formed by the knife in cutting out the flap of the preceding envelop. Fig. XIX is an enlarged sectional view taken on line XIX XIX, Fig. XVIII. Fig. XX is a like view taken on line XX XX, Fig. XVIII. Fig. XXI is a detail sectional view of the central part of the machine. Figs. XXII and XXIII are diagrammatic views illustrating the operation of the folding, cutting, pasting, and transmitting mechanism. Fig. XXIV is a detail perspective view of the paper-web from which the envelop is made. Fig. XXV is a perspective view of the envelop before the flap is turned down. Fig. XXVI is a perspective view of the completed envelop. Fig. XXVII is a perspective view of an open envelop or an envelop not designed to be sealed and which my machine is capable of producing.

Referring to the drawings, 1 represents the main frame of the machine, at one end of which the roll of paper 2 from which the envelops are made is located on arms or brackets 3, extending from the frame 1. The roll 2 is supported on a spindle 4, (see Fig. IX,) the ends of the spindle fitting in notches formed in the brackets 3, so that the spindle is free to revolve when the machine is in operation. The spindle has a threaded end 5, upon which fits an internally-threaded cone 6, and a notched end 7, upon which fits a cone 8, provided with a spring-actuated dog or pawl 9, that engages with the notches. These rolls of paper are sometimes irregularly wound, so that it becomes necessary to furnish some means to direct the web of paper accurately to the machine to enable the different parts of the machine to perform their functions properly. To accomplish this and at the same time provide a tension which will prevent the overrunning of the paper, I employ an arm 10, (see Figs. I, II, and III,) having bearings 11, through which the spindle 12 of a loose roller 13 passes, as shown in Fig. VIII. The outer end of the arm 10 is perforated and split to provide a clamp $10^a$, controlled by a bolt $10^b$. This clamp is adapted to receive the shank 14

(see Fig. X) of a block 15, through which an adjustable rod 16 passes and in relation to which the rod is held from movement by means of a set-screw 17. (Shown in Fig. I.) By loosening on the clamp 10ᵃ the rod 16 may be swung horizontally to compensate for irregularities in the roll of paper. Some rolls are unevenly wound, being tighter at one end than at the other, and it is important that the point of contact between the guide and the periphery of the roll should be in the line of tension of the paper, so as to prevent the buckling of the paper, which is liable to result in the web being torn or broken. On one end of the rod 16 is a fixed head 18 and on the other a loose disk 19, pushed forward by a spring 20, between which and the disk a sleeve 21 may be located. The spring 20 surrounds the outer end of the rod 16 and is located between the sleeve 21 and a nut 22, tapped onto the rod, so that it may be turned up or back to regulate the tension of the spring and also for adjustment of the disk 19 when rolls of paper of different widths are used.

23 represents a loose roller on the rod 16, and which bears against the periphery of the roll of paper, as shown in Fig. X, this roller being held against the periphery of the paper by means of a counterbalance-weight 24, (see Fig. I,) adjustably held to a rod or arm 25, secured to a head 25ᵃ, secured to one end of the spindle 12, to which, as stated, the arm 10 is also secured by bearings 11, this weight 24 thus acting to hold the roller 23 up against the periphery of the roll of paper, the head 18 and disk 19 embracing the sides of the roll of paper, as shown in Fig. X, and thus directing the paper accurately into the machine, notwithstanding the roll of paper itself may be untrue, so that it wabbles when the machine is running. By providing for the adjustment of the rod 16 in the head or block 15 the guide can be adjusted so that the fixed head 18 thereof will be just one-half the width of any roll of paper from the center of the machine.

The web of paper passes over the roller 13, as shown in Fig. III, and beneath the roller 26 of the printer 27, in which no novelty is claimed and which may be of any well-known arrangement. From the roller 26 the web passes over a roller 28 and behind a roller 29, the rollers 28 and 29 being journaled in suitable standards on the frame 1, as shown at 30, Figs. I and III. As the web passes back of the roller 29 gum is applied near the edges thereof by disks 31, revolving in a stationary pot 32, secured to the frame of the machine. These disks are secured to a shaft 33, journaled in the upper ends of arms 34, secured to a rock-shaft 35, which is also provided with a crank 36, (see Fig. II,) that has a friction-roller 37 bearing against a cam 38, adjustably secured to one of the driving-pinions of the machine by means of bolts 40 fitting in slots 41 in the cam, as shown in Fig. I. As the roller 37 bears against the salient part of the cam, the gumming-disks 31 are held away from the paper, and when the reduced portion of the cam reaches the roller 37 the disks are drawn up against the paper to deposit paste or gum thereon. The gum that is deposited on the web of paper by the disks 31 is that which sticks the edge fold of the web to the front of the envelop, as shown at A, Figs. XXIV and XXV.

From the roller 29 the web of paper passes through a device shown in Fig. V and which gives the edge folds to the paper. This device consists of a pair of blocks 42, supported on a rod 43, adjustably held in clips 44 by means of set-screws 45, so that the blocks may be moved together in a direction crosswise of the machine. The blocks are adjustably held to the rod 43 by means of set-screws 46, so that they can be respectively adjusted on the rod to suit the width of paper being used. The clips 44 have a slot-and-bolt connection 47 with a bar 48, so that the blocks 42 can be adjusted vertically as occasion may require. The bar 48 has slot-and-bolt connection 49 with brackets 50, thus providing further for the vertical adjustment of the blocks 42. The brackets 50 rest upon standards 51 at each side of the machine, with which they have a slot-and-bolt connection 52, which permits of an adjustment of the blocks 42 lengthwise of the machine. Ample provision is thus made for the adjustment of the blocks in any direction. The inner faces of the blocks are grooved, as shown at 53, so that as the paper passes between the grooved faces of the blocks, as shown in Fig. V, its edges are folded, and to further facilitate this folding of the edges of the paper a plate 54 is provided, the ends of which enter the grooves 53 of the blocks, the paper being folded over the ends of the plate. The plate is supported by a bracket 55, having a slot-and-bolt connection 56 with the bar 48, so that the plate can be adjusted laterally of the machine. It will thus be observed that as the web of paper passes along its edges will be folded over. The grooves 53 in the blocks 42 taper inwardly, as shown in Fig. XXI, so as to assist in the folding action. The blocks may have grooves beneath the rod 43, as well as above the rod, so that when they become worn they may be turned over and transposed, the lower grooves thus being brought into position to act upon the paper.

From the folding device the paper passes over a roller 57 and beneath a roller 58, (see Fig. XXI,) these rollers being journaled in the standards 51, that are supported on the frame of the machine. The blocks 42 are located in a position that will cause the grooves 53 to be located at a lower elevation than the top of the roller 57, so that as the paper passes from beneath the plate 54 the tendency is to fold the edges of the paper neatly down upon the web, and to assist further in this action I provide fingers 59, (see Fig. V,) under which the web passes as it rises to pass over the roller 57. These fingers project from U-shaped brackets 60, having slot-and-bolt connection 61 with the bar 48, so that they can be adjusted laterally of the machine to suit the width of the web of paper being used, and they may also be adjusted vertically, inasmuch as the bolts that connect them to the bar fit in their U-shaped openings. The fingers 59, the blocks 42, and the plate 54 all being carried by the bar 48 provide for an adjustment of all of these simultaneously without disturbing their relative positions, this adjustment being effected by shifting the bar vertically on the brackets 50 or by shifting the brackets 50 horizontally on the standards 51. As the paper passes between the rollers 57 and 58 the edge folds are pressed closely and firmly down on the web of paper, which then passes back of a roller 62, journaled in the standards 51, as shown in Figs. III and XXI. As the paper passes over the roller 57 the outer faces of the folds are gummed, the portion of the fold that is gummed being indicated at B, Fig. XXIV. This gumming is effected by means of disks 63 on a shaft 64, the disks revolving in a paste-pot 65, stationarily fixed to the frame 1 of the machine, as shown in Fig. XXI. The shaft 64 is journaled in the upper ends of cranks 66, secured to a rock-shaft 67, journaled to the frame 1 of the machine. On one end of the shaft 67 is a lever 68, provided with a friction-roller 69, that engages a cam 70, adjustably held by slot-and-pin connection 71 to one of the driving-pinions of the machine, as shown in Fig. I. When the salient part of the cam 70 is bearing against the friction-roller of the lever 68, the pasting-disks 63 are held away from the web of paper, and when the reduced part of the cam reaches the friction-roller the disks are drawn up against the web to apply the paste to the part B. The shaft 64 of the disks 63 is provided with a grooved pulley 72, and the shaft 33 of the disks 31 is provided with a grooved pulley 73. The shaft 62ª of the roller 62 is provided with a double-grooved pulley 74, and to drive the pasting-disks from the shafts 62ª the pulleys 72 and 73 are connected to the pulley 74 by means of belts 75, as shown in Fig. II. The friction of the web on the roller 62 is sufficient to revolve the pasting-disks. At the other ends of the shafts 33 and 64 from the pulleys 72 and 73 are grooved pulleys 76, that receive a belt 77, connecting the two shafts together. To provide a means for drawing the pasting-disks forward when the reduced part of the cams reach the friction-rollers of the disk-shafts, as stated, the belts 75 and 77 are made in flexible form, preferably of coiled wire, so that while they act to draw the pasting-disks forward they yet remain sufficiently taut to revolve the disks when in contact with the web and deposit the gum thereon.

78 represents scrapers for removing the surplus gum or paste from the disks 31 and 36.

From the roller 62 the web passes beneath a roller 79, journaled in standards 80, supported on the frame 1, as shown in Fig. XXI. From the roller 79 the web passes between an upper roller 81 and a lower roller 82, journaled in the standards 80, and the upper one of which carries a knife and a folding-blade, while the lower one carries a pair of clamps and a pair of movable guide-pins. Before the web reaches the rollers 81 82 it has been pasted at A and B, Fig. XXIV, and the next operation is to give the bottom transverse fold to the envelop, this fold being indicated by the dotted line C, Fig. XXIV, and it is effected by a blade 83, carried by the roller 81, that presses the web into a groove 84, formed in the periphery of the roller 82. (See Figs. XXI, XXII, and XXIII.) This folding action is illustrated as taking place in Fig. XXI, and to hold the paper in the groove after it has been forced there by the blade 83 I have located in the bottom of the groove a rock shaft or rod 85, that is provided with a blade 86. (Best illustrated in Figs. XXII and XXIII.) At the time that the web is being folded into the groove 84 the blade 86 is held against the forward wall of the groove 84 by means of a spring-arm 87 on the rock shaft or rod 85, this arm bearing against a cam 88 on a bushing 89, (see Fig. XVII,) held by a set-screw 90 in a socket 91, supported from the frame of the machine, the shaft 82ª of the roller 82 passing through the bushing 89. Just as the blade 83 folds the web into the groove 84 the spring-arm 87 leaves the cam 88, which it is just about to do in Fig. XXI, and a torsional or other spring 92, that connects the shaft 85 to the end of the roller, as shown in Fig. XVII, draws the blade 86 toward the rear wall of the groove 84, and thus clamps the paper in the groove and holds it firmly there while the blade 83 draws out of the groove. To enable the blade to be drawn out of the groove without a twisting strain being exerted thereon, the blade is located in a slot 93, formed in the periphery of the roller 81 (see Fig. XXII) and held therein by a rock shaft or rod 94. The blade is normally held against the forward wall of the groove 93 by a spring 95; but as the blade comes against the web of paper the spring yields and the blade contacts with the rear wall of the groove as it forces the web of paper into the groove 84 of the roller 82, and then as the blade is withdrawn from the groove after the blade 86 has clamped the paper the shaft 94 turns in its bearing and allows the blade to be withdrawn from the groove without a twisting action being exerted thereon. When the web of paper is caught by the clamping-blade 86, it is drawn around by the roller 82, the back D of the envelop (see Fig. XXIV) being folded against the front E, Fig. XXIV, as illustrated in Fig. XXII, the back portion of the envelop being drawn from over a stationary plate 96, onto which it had been directed. As the rollers 81 and 82 continue to revolve a V-shaped knife 97, carried by the roller 81, severs the web of paper on the dotted line F, Fig. XXIV, the knife cutting against a steel strip 98, that is secured to and forms part of the roller 82. Forward of the roller 82 is a gumming and folding roller 99, supported on a shaft 100. This roller is provided with a blade 101, constructed and arranged to have a radial movement with relation to the axis of the roller. As shown in Figs. XI and XIII, the blade 101 fits in a groove formed in the roller 99 and is held in its inner position by means of springs 102 until projections 103 thereon contact with cams 104, and then the blade is forced in an outwardly direction. The cams 104 extend from bushings 105, fitting in sockets 108 on arms 109, supported from the frame of the machine, the shaft 99$^a$ of the roller 99 passing through the bushings 105. As the blade is projected outwardly it forms the flap-fold of the envelop, (illustrated by the dotted line G, Fig. XXIV,) and it thus forms this fold by pressing the web into a groove 110 in the roller 82. (See Figs. XXII and XXIII.) The parts are so disposed that as the blade 101 comes opposite the groove 110 it is projected outwardly into the groove by the cams 104, and then it recedes from the groove. The paper is gripped by a blade 111, located in the groove and which when the paper is being folded into the groove is held against the forward wall of the groove by a spring-arm 112, (shown in Fig. XVII and by dotted lines in Fig. XXII,) bearing against a cam 113, the arm being secured to a rock-shaft that carries the plate, as already described in connection with the plate 86 and its rock-shaft 85. The arm 112 leaves its cam as the plate 101 recedes, and the blade 111 is caused to grip the paper by means of a spring 114, secured to the rock-shaft of the blade and connected to the end of the roller 82. (See Fig. XVII.)

As the envelop passes between the rollers 82 and 99 the gum by which the envelop is sealed when in use is applied. This gum may be applied either to the flap or to the back of the envelop with which the flap contacts when the envelop is in use, and to apply the gum at either place and also to provide for the application of the gum at either place by a quick and easy adjustment I provide the roller 99 with two gumming-dies, one of which appears at 115, Fig. XV, and the other at 116. These dies are separated by the plate 101 and are held to the roller by means of guide-screws 117 and adjusting-screws 118. Behind each die and fitting in sockets formed in the roller are springs 119. (See Fig. XIV and dotted lines, Fig. XV.) If the gum is to be applied to the flap of the envelop, the screw 118 of the die 115 is slightly loosened, thus allowing the spring 119 to force the die out against the heads of the screws 117, which brings the die 115 into active position. If the gum is to be applied to the back of the envelop, the screw 118 of the die 115 is tightened and the screw 118 of the die 116 is loosened, permitting the latter die to move to active position, while the die 115 will not receive gum, and thus it becomes inactive. The gum is applied to the dies by means of a roller 120, (see Figs. III, IV, and XXI,) revolving in a pot 121, and which receives the contact of the die 115 or the die 116, according to which is in active position. It is sometimes desirable for a certain class of envelops to gum both the back and the flap, and this can be done with my machine by adjusting both dies to operative position.

The roller 120 is journaled in boxes 122, one of which is shown in Fig. VI, the journals of the roller fitting in sockets 123, formed in the boxes 122, and held therein by plates 124, having slot-and-pin connections 125 with the blocks. The boxes 122 fit in openings 126 in the frame 1, one of these openings being shown in Fig. III. The boxes may be adjusted to move the roller 120 forward by means of set-screws 127. The pot 121 is supported by means of adjustable brackets 128 thereon, (see Fig. VII,) that are notched at 129 to receive a rod 130, supported by the boxes 122. The pot 121 is thus held by the same boxes that hold the roller 120, so that they can be moved forward or backward to permit the roller 120 to be moved to and from the roller 99 while the roller is revolving in the direction of the arrow, Fig. III, against the edge of the pan which removes the surplus gum.

In cutting the web the knife leaves points H, Fig. XXIV, which must be cut off on the dotted line J. As the web moves forward after being cut by the knife 97 it passes onto the stationary plate 96, and to avoid danger of the points H passing under the plate and to insure the passage of the web onto the plate I employ short pins 131 (see Fig. XVII) that fit in grooves 132, formed in the periphery of the roller 82, these pins being secured to levers 133, pivoted to the end of the roller at 134, (see Fig. XXII,) so that as the roller 82 revolves the outer ends of the levers 133 will contact with collars 136 on the shaft of roller 79, (see Figs. II and XXII,) this contact taking place just after the knife has severed the web, so that the upward movement of the pins 131 will lift the corners and direct the web onto the stationary plate 96. Before the plate 83 comes around again to fold the web into the groove 84 the corners H of the web have been clipped off on the dotted lines J. This is accomplished by a pair of blades 137, located at the upper end of the stationary plate 96, and a pair of revolving blades 138. The arrangement of the blades 137 is best shown in Figs. XVIII, XIX, and XX. They are pivoted at 139 to a bar 140, supported by the main frame of the machine. (See Fig. IV.)

141 represents pins fitted in the outer ends of the blades 137 and the inner ends of which are received by grooves 142 in the bar 140.

143 represents springs secured to the outer ends of the blades 137, the other ends of the springs being made fast to arms 144, projecting from the bar 140. (See Fig. XIX.) The springs 143 act to pull the outer ends of the blades 137 in a direction toward the blades 138, the pins 141 limiting the movement of the blades. The blades 137 are thus held at an inclination to the line of travel of the web of paper, and as the blades 138 revolve past the blades 137 the springs 143 allow the outer ends of the latter blades to move back, permitting the blades 138 to pass, a shearing cutting action being thus effected by the blades 137. The blades 138 are set at an inclination, as shown in Fig. IV, so that they will have a shearing action in cutting the web, their inner ends first passing the inner ends of the blades 137, and as their outer parts pass the blades 137 the latter recede, as stated. The blades 138 are secured to a shaft 145, journaled in the frame 1 of the machine and geared, as shown at 146, Fig. II, to the main driving-shaft 147, to which is secured the tight and loose pulleys 148. The parts are so disposed that just after the corners H are clipped off of the web the blade 83 folds the web again in the groove 84 of the roller 82, and the portion of the web that has been run onto the stationary plate 96 is now drawn back around the lower end of the stationary plate and forms the back of the next envelop.

149 represents the guide-arm, secured to the bar 140, and beneath which the web passes, as shown by dotted lines, Fig. XXI, the web being held by the guide down upon the plate 96.

Before the envelop passes from between the rollers 82 and 99 the arm 87 of the plate 86 contacts with the cam 88 and releases the lower edge of the envelop, which assumes the position seen in Fig. XXIII, the envelop being held at this time in the groove 110 by the blade 111. After the sealing-gum has been applied the arm 112 of the blade 111 comes in contact again with its cam 113, and the completed envelop is now received by a transferring device that delivers it to a pair of wheels or disks 150. (See Figs. IV, XXI, XXII, and XXIII.) The wheels or disks 150 are secured to a shaft 151, and they are placed a short distance apart, as shown in Fig. IV, so as to permit the flap of the envelop to remain open or away from the back thereof while it is traveling around the wheels, at which time the sealing-gum is being dried. Each wheel is provided with a belt 152, each belt bearing against its wheel from 153 to 154, Fig. XXI, and then passing over rollers 155, supported by stationary frames 156, as seen in Fig. XXI. One of the rollers 155 of each belt is connected to the frame 156 by an adjustable arm 155ª, so that by moving the arm the belt may be tightened or loosened. The transferring device delivers the envelop to the wheels 150 near the point 153, and the ends of the envelop are grasped between the wheels and their respective belts, the flap of the envelop being free, as shown at 157, Fig. XXI, so that, as stated, the sealing-gum has an opportunity to dry while the envelops are being carried around the wheels to the point 154, where they are delivered onto a belt 158, which conducts them from the machine, the envelops passing under a pair of cords 159, (see Figs. IV and XXI,) that pass around a loose rod or shaft 160. The envelops are directed to their position between the belt 158 and the cords 159 by disks 161, supported by arms 162, secured to collars 163 on a fixed rod 170, (see Fig. IV,) the rod 170 being supported in the frames 156, that support the rollers 155.

The device that transfers the envelops to the wheels 150 consists of a plate 171, secured to a rod 172, (see Figs. XXII and XXIII,) supported in slotted arms 173, mounted on a rock-shaft 174, that is journaled in the frame of the machine at 175, Fig. IV. On one end of the shaft 174 is an arm 176, adapted to be engaged by a cam 177 on the shaft 145. On the plate 171 is a projection 178, onto which the envelops drop as they merge from between the rollers 82 and 99, the plate at this time being in the position shown in Fig. XXIII, so that it forms a back for the envelops to rest against. The plate is held in the position shown in Fig. XXIII by its lower end 179 resting against a stop 180, projecting from an arm 181, located between the shaft 174 and the rod 170. (See Figs. IV and XXI.) When the plate 171 is in the position shown in Fig. XXIII, the cam 177 is not operating on the arm 176, at which time the arms 173 are being held down by springs 182, that connect the arms to the rod 170, the arms thus acting to press the end 179 of the plate against the stop 180, which forces the plate back to the position shown in Fig. XXIII. As the envelop drops onto the plate the cam 177 engages the arm 176 and by rocking the shaft 174 lifts the arms 173 from the position shown in Fig. XXIII to the position shown in Fig. XXII, and a spring 183, that connects the plate 171 to the shaft 151, then draws the plate forward and the envelop falls onto the wheels 150 and is carried around between the wheels and the belt 152, as explained. The slots in the arms 173 are made sufficiently long to allow the plate to move slightly, as shown by dotted lines, Fig. XXII, under friction with the wheels, so that the plate holds the envelop until the latter is caught between the belts and the wheels. As soon as the cam leaves the arm 176 the springs 182 draw the arms 173 downwardly again, causing the plate 171 to resume the position shown in Fig. XXIII to receive the next envelop.

As the envelops leave the machine the gum or paste is thoroughly dried by a current of hot air forced through them from a perforated pipe 185. (See Figs. II and III.)

The gearing of the machine is arranged as follows: 147 represents the drive-shaft provided with the pulleys 148. This shaft is in the form of a short stud journaled in one of the side bearings of the frame and has upon it a pinion 200, (see Figs. I and II,) that meshes into a pinion 201 on the shaft of the roller 82. On the other end of the shaft of the roller 82 is a pinion directly beneath and which meshes with a pinion 202 on the shaft of the roller 81, so that the rollers 82 and 81 are driven from the same shaft 147. The pinion that is directly beneath the pinion 202 also meshes with a pinion 203 on the shaft of roller 99. The pinion 202 is connected through means of an idler 204 with a pinion 205 on the shaft 145. On the shaft of roller 99, near the pulley side of the machine, is a pinion 206, that meshes with a pinion 207 on the shaft of the roller 120. The pinion directly beneath the pinion 202 also meshes with a pinion 208 on the shaft of roller 79, and on the shaft of roller 79, near the pulley side of the machine, is a pinion 209, engaging a pinion 210 on a short shaft journaled in the frame of the machine and which in turn engages a gear-wheel 211 on the shaft 151, whereby the latter is driven. On the shaft 151 is a pulley 212, that receives a belt 213, that drives the carrier-belt 158, the belt 213 passing around a pulley on a shaft (not shown) that carries the outer end of the belt 158. The pinion 201 meshes with the pinion 214, that engages a pinion 215, that in turn engages a pinion 216, to which the cam 70 is secured. The pinion 216 meshes with a pinion 217, that engages a pinion 218, the latter pinion engaging a pinion 219, which carries the cam 39. The pinion 219 is connected through idler-pinions 220 with the gear-wheel 221 on the shaft of roller 26, and the roller 26 is geared, as shown in in Fig. I, to the printing device. The pinions 214 to 220, inclusive, are secured to short studs journaled in the frame of the machine.

In Fig. XXVI there is shown an envelop designed to be used without sealing. In making this envelop the disks 31 apply the paste to what is the back of the completed envelop or the part represented at I, Fig. XXVII, so that the edge fold is pasted down to the back instead of being pasted down to the front of the envelop, as shown in Fig. XXV. The disks 63 then apply the paste to the outer face of the fold of the front of the envelop, the part A, Fig. XXIV, so that the two adjacent faces of the edge folds are pasted together when the envelop is folded on the line C. This leaves the face of the envelop free at the ends, as shown at K, Fig. XXVII, instead of the back being free at the ends, as shown at L, Fig. XXV, and to add strength and finish to the envelop short ends M of the fold are folded down against the back of the envelop, as shown at N, Fig. XXVII, and cemented thereto. To apply the gum to these short pieces M without applying it to any other part of the envelop, the dies 115 and 116 are cut away, except at the extreme ends, as shown at 115$^a$ and 116$^a$, Fig. XIV, these parts 115$^a$ and 116$^a$ applying the paste to the small points M, so as to cause them to adhere to the back of the envelop when the flap is folded.

I claim as my invention—

1. In an envelop-machine, the combination of means for supporting a roll of paper, adjustable in width, and means having heads for engaging the ends of the roll to direct the web of paper accurately to the machine and adapted to be swung horizontally, and adjustable bodily transverse of the machine, so that the central point between the heads may be kept in the center of the machine; substantially as described.

2. In an envelop-machine, the combination of means for supporting a roll of paper, adjustable in width, means having heads for engaging the ends of the roll to direct the web of paper accurately to the machine, and adapted to be swung horizontally and adjustable bodily transverse of the machine, so that the central point between the heads may be kept on the center of the machine, and means for engaging the periphery of the roll; substantially as described.

3. In an envelop-machine, the combination of means for supporting a roll of paper, and means for directing the web of paper accurately to the machine, consisting of a rod adapted to be swung horizontally and adjustable transverse of the machine, having a head engaging one end of the roll, and a disk engaging the other end of the roll; substantially as set forth.

4. In an envelop-machine, the combination of means for supporting a roll of paper, and means for directing the web of paper accurately to the machine, consisting of a rod adapted to be swung horizontally and adjustable transverse of the machine, having a head engaging one end of the roll, and a loose spring-actuated disk engaging the other end of the roll; substantially as set forth.

5. In an envelop-machine, the combination of means for supporting a roll of paper, and means for directing the web of paper accurately to the machine, consisting of a rod adapted to be swung horizontally and adjustable transverse of the machine, having a head engaging one end of the roll, and a disk engaging the other end of the roll; said rod being carried by a pivoted support provided with a counterbalance, whereby the rod with the head and disk are caused to move toward the center of the roll as the roll diminishes in size; substantially as set forth.

6. In an envelop-machine, the combination of means for supporting a roll of paper, and means for directing the web of paper accurately to the machine, consisting of a head engaging one end of the roll, a loose spring-actuated disk engaging the other end of the roll, and a rod carrying said head and disk, adapted to be swung horizontally and adjustable transverse of the machine; substantially as set forth.

7. In an envelop-machine, the combination of means for supporting a roll of paper, and means for directing the web of paper accurately to the machine, consisting of a head engaging one end of the roll, a disk engaging the other end of the roll, a rod to which said head is secured and which passes through said disk, a nut on the disk end of said rod, and a spring located between said nut and said disk, the rod being adjustable transverse of the machine and adapted to be swung horizontally; substantially as set forth.

8. In an envelop-machine, the combination of means for supporting a roll of paper, and means for guiding the web of paper accurately to the machine and preventing the overrunning of the roll, consisting of a pivoted arm provided with a counterbalance-weight, a rod adjustable transverse of the machine and adapted to be swung horizontally, mounted on said arm, a head on one end of said rod adapted to engage one end of the roll of paper, a disk on the other end of said rod adapted to engage the other end of the roll of paper, and a roller mounted on said rod and adapted to bear against the periphery of the roll of paper; substantially as set forth.

9. In an envelop-machine, the combination of means for supporting a roll of paper, adjustable in width, and means having heads for engaging the ends of the roll to direct the web of paper accurately to the machine and adjustable horizontally on a supporting-pivot; substantially as set forth.

10. The paper-guide comprising a spindle, a counterbalance secured to the spindle, the arm having bearings at its inner end, secured to the spindle, and a clamp at its outer end, the block mounted in the clamp, the rod adjustably secured to the block, the loose roller mounted on the rod and adapted to bear on the roll, the fixed head secured to the rod, the loose disk mounted on the rod, and a spring whereby the loose disk is pushed forward; substantially as described.

11. The paper-guide comprising a spindle, a counterbalance secured to the spindle, the arm having bearings at its inner end secured to the spindle and a clamp at its outer end, the block mounted in the clamp, the rod secured to the block, the loose roller mounted on the rod, the fixed head secured to rod, the loose disk mounted on the rod, the loose sleeves mounted behind the disk, the nut tapped onto the rod, and a spring located between the nut and the sleeve; substantially as described.

12. In an envelop-machine, means for folding the edges of the web of paper, consisting of blocks having vertical faces formed with grooves and adjustably held with relation to each other, a plate arranged horizontally for holding the edges of the paper in the grooves of the blocks, a bar to which the blocks and plate are adjustably connected, and adjustable brackets to which said bar is adjustably connected, substantially as set forth.

13. In an envelop-machine, means for folding the edges of the web of paper, consisting of blocks having vertical faces formed with grooves, a horizontally-arranged plate acting to hold the web of paper in the grooves of the blocks, a roller over which the web of paper passes from said blocks, and fingers located between said blocks and roller and which bear against the folds of the paper, substantially as set forth.

14. In an envelop-machine, means for folding the edges of the web of paper, consisting of blocks having vertical faces formed with grooves, a horizontally-arranged plate for holding the paper in the grooves of the blocks, a roller over which the paper passes from the blocks, and adjustable fingers located between said blocks and roller, and which are adapted to bear against the folds of the paper, substantially as set forth.

15. In an envelop-machine, the combination of two pairs of pasting-disks, means for folding the edges of the web of paper located between said pasting-disks, cams for holding the pasting-disks out of contact with the paper, and means for drawing the pasting-disks into contact with the paper when released by the cams, consisting of flexible belts by which the disks are also turned, substantially as set forth.

16. In an envelop-machine, means for forming the bottom fold of the envelop, consisting of a grooved roller provided with a spring-actuated clamping-blade, and a roller provided with a spring-actuated pivoted blade for folding the paper into the groove of the first-mentioned roller, substantially as set forth.

17. In an envelop-machine, means for forming the fold at the bottom of the envelop, consisting of a grooved roller having a spring-actuated blade provided with an arm adapted to contact with a cam for moving the blade in opposition to the spring, and a roller provided with a spring-actuated pivoted blade for folding the paper into the groove of the first-mentioned roller, substantially as set forth.

18. In an envelop-machine, the combination of a roller provided with a clamping-blade, a roller provided with a folding-blade and a cutter, a stationary plate and means for directing the paper onto the plate, after it has been severed by the cutter, consisting of levers pivoted to the ends of the clamping-roller, said levers being provided with pins fitting in grooves formed in the periphery of the roller, and means for engaging said levers to lift said pins and direct the paper onto the plate, substantially as set forth.

19. In an envelop-machine, the combination of a roller provided with a clamping-blade, and a roller provided with a folding-blade and a cutter, said first-mentioned roller being provided with a steel plate forming a bed in its cylindrical surface against which said cutter acts in severing the paper, substantially as set forth.

20. In an envelop-machine, a combined folding and pasting roller having a pair of pasting-dies separated by a radially-moving folding-blade, substantially as set forth.

21. In an envelop-machine, a roller provided with a pair of dies adapted to apply the sealing-paste to the flap of the envelop and also to the back of the envelop at the point against which the flap contacts when the envelop is sealed, substantially as set forth.

22. In an envelop-machine, a roller provided with a pair of dies adapted to apply the sealing-paste either to the back or the flap of the envelop, and means for moving and holding either one of said dies out of active position, substantially as set forth.

23. In an envelop-machine, a roller provided with a pair of dies for applying the sealing-paste either to the back or the flap of the envelop, springs located behind said dies, screws for limiting the outward movement of the dies, and screws for adjusting the dies so that either one may be moved and held out of operative position, substantially as set forth.

24. In an envelop-machine, a roller provided with a pair of dies for applying the sealing-paste either to the back or to the flap of the envelop, means for forcing the dies outwardly, and means for holding the dies to their inner position, so that either die may be brought and held to operative position, while the other die is held in inoperative position, substantially as set forth.

25. In an envelop-machine, the combination of a die-roller for applying the sealing-paste to the envelop, a paste-roller, a paste-pan against the edge of which the paste-roller revolves, and adjustable boxes carrying both the paste-roller and the paste-pan together, substantially as set forth.

26. In an envelop-machine, means for cutting off the corners of a web of paper, consisting of a pair of blades, a fixed bar to which the inner ends of said blades are pivoted, pins fitting in the outer ends of said blades and the inner ends of which fit in grooves formed in said bar, springs for holding said blades at an inclination, and a pair of rotating blades set at an inclination, substantially as set forth.

27. In an envelop-machine, the combination of a clamp-roller, a folding-roller, a stationary inclined plate onto which the web passes as it emerges from between said rollers, and rotating cutters located at the far side of said plate from said rollers for clipping off the corners of the web of paper, substantially as set forth.

28. In an envelop-machine, the combination of a clamp-roller, a folding-roller, a stationary plate on which the web passes as it merges from between said rollers, cutting-blades located at the far side of said plate from said rollers for clipping off the corners of the web, and means for directing the web onto said plate, substantially as set forth.

29. In an envelop-machine, the combination of a clamp-roller, a folding-roller located above the clamp-roller, a stationary plate onto which the web of paper passes as it merges from between said rollers, cutting-blades located at the far side of said plate from said roller for clipping off the corners of the web of paper, and means carried by said clamp-roller for directing the web of paper onto said plate, substantially as set forth.

30. In an envelop-machine, the combination of forming mechanism, a delivery mechanism, and means for transferring the envelops from the former to the latter, consisting of a plate provided with a stop to receive the envelops, a rod to which the plate is secured, slotted arms in which said rod fits, a rock-shaft to which the arms are secured, springs for moving said arms in one direction, a cam for moving the arms in the other direction, a stop against which an extension of said plate bears, and springs for tilting said plate when released by the raising of said arms, substantially as set forth.

31. In an envelop-machine, the combination of forming mechanism, a delivery mechanism, and means for transferring the envelops from the former to the latter, consisting of a swinging plate having a projection to arrest the downward movement of the envelop, and means for moving the plate after it has received an envelop, substantially as set forth.

32. In an envelop-machine, the combination of forming mechanism, a pair of wheels for delivering the envelops after they are formed, and means for transferring the envelops from the forming mechanism to said wheels, consisting of a plate supported in slotted arms and having an extension bearing against a stop, and a spring for drawing said plate against said wheels when said arms have been raised, substantially as set forth.

33. In an envelop-machine, the combination of a pair of delivery-wheels, and means for conveying the envelops from the wheels, consisting of a belt, a pair of disks delivering the envelops from the wheels and a pair of cords beneath which the envelops are carried, substantially as set forth.

34. In an envelop-machine, the combination of a delivery-belt, a pair of cords beneath which the envelops are carried on the belt and a perforated pipe arranged in line with the belt, for directing a current of hot air through the envelops between the belt and cords as they are carried by the belt, substantially as set forth.

35. In an envelop-machine, the combination of a delivery-belt, means whereby the envelops are conducted edgewise from the machine and a perforated pipe arranged in line with the belt, for directing a current of hot air through the envelops as they are carried by the belt; substantially as set forth.

JAMES WEST.

In presence of—
  E. S. KNIGHT,
  G. A. TAUBERSCHMIDT.